(12) United States Patent
Lu et al.

(10) Patent No.: US 8,050,857 B2
(45) Date of Patent: Nov. 1, 2011

(54) SYSTEM AND METHOD FOR DYNAMICALLY DETERMINING VEHICLE LOADING AND VERTICAL LOADING DISTANCE FOR USE IN A VEHICLE DYNAMIC CONTROL SYSTEM

(75) Inventors: Jianbo Lu, Livonia, MI (US); Keith Mattson, Livonia, MI (US); David Messih, Farmington Hills, MI (US); Erik Chubb, Hazel Park, MI (US); Albert Salib, Superior Township, MI (US)

(73) Assignee: Ford Global Technologies, Dearborn, MI (US)

( * ) Notice: Subject to any disclaimer, the term of this patent is extended or adjusted under 35 U.S.C. 154(b) by 4 days.

(21) Appl. No.: 12/652,510

(22) Filed: Jan. 5, 2010

(65) Prior Publication Data

US 2010/0106360 A1    Apr. 29, 2010

Related U.S. Application Data

(62) Division of application No. 10/966,395, filed on Oct. 15, 2004, now Pat. No. 7,668,645.

(51) Int. Cl.
*B60R 21/0132* (2006.01)

(52) U.S. Cl. .......................................... 701/124; 701/38
(58) Field of Classification Search .................. 701/124, 701/38
See application file for complete search history.

(56) References Cited

U.S. PATENT DOCUMENTS

| | | | |
|---|---|---|---|
| 2,917,126 A | 12/1959 | Phillips | |
| 3,604,273 A | 9/1971 | Kwok et al. | |
| 3,608,925 A | 9/1971 | Murphy | |
| 3,765,466 A | 10/1973 | Tsuruta | 152/210 |
| 3,797,893 A | 3/1974 | Burckhardt | |
| 3,804,435 A | 4/1974 | See et al. | 280/733 |
| 3,883,172 A | 5/1975 | Barton et al. | 296/65.02 |
| 3,899,028 A | 8/1975 | Morris et al. | |
| 3,948,567 A | 4/1976 | Kasselmann et al. | |
| 3,972,543 A | 8/1976 | Presley et al. | |
| 4,023,864 A | 5/1977 | Lang et al. | |

(Continued)

FOREIGN PATENT DOCUMENTS

DE    36 16 907    11/1987

(Continued)

OTHER PUBLICATIONS

U.S. Appl. No. 10/849,590, filed May 20, 2004, Brown.

(Continued)

*Primary Examiner* — Mark Hellner
*Assistant Examiner* — Ari M Diacou
(74) *Attorney, Agent, or Firm* — Angela M. Brunetti; Fredrick Owens

(57) ABSTRACT

A control system (18) and method for an automotive vehicle (10) includes a roll rate sensor (34) for generating a roll rate signal, a lateral acceleration sensor (32) for generating a lateral acceleration signal, a longitudinal acceleration sensor (36) for generating a longitudinal acceleration signal, and a yaw rate sensor (28) for generating a yaw rate signal. A safety device or system (44) and the sensors are coupled to a controller. The controller (26) determines an added mass and the height of the added mass on the vehicle, or a roll gradient, a roll acceleration coefficient, and/or a roll rate parameter that take into account the added mass and height from the roll rate, the lateral acceleration, the longitudinal acceleration, and the yaw rate of the vehicle, and controls the safety system in response thereto.

5 Claims, 5 Drawing Sheets

U.S. PATENT DOCUMENTS

| | | |
|---|---|---|
| 4,092,716 A | 5/1978 | Berg et al. ............... 701/3 |
| RE30,550 E | 3/1981 | Reise |
| 4,294,113 A | 10/1981 | Sprott et al. |
| 4,480,714 A | 11/1984 | Yabuta |
| 4,548,079 A | 10/1985 | Klatt |
| 4,592,565 A | 6/1986 | Eagle |
| 4,597,462 A | 7/1986 | Sano et al. |
| 4,624,476 A | 11/1986 | Tanaka et al. |
| 4,650,212 A | 3/1987 | Yoshimura |
| 4,679,808 A | 7/1987 | Ito et al. |
| 4,690,553 A | 9/1987 | Fukamizu et al. |
| 4,691,798 A | 9/1987 | Engelbach ............... 180/209 |
| 4,696,489 A | 9/1987 | Fujishiro et al. |
| 4,705,130 A | 11/1987 | Fukunaga et al. |
| 4,708,577 A | 11/1987 | Fratzke ............... 414/635 |
| 4,712,807 A | 12/1987 | Kurosawa |
| 4,761,022 A | 8/1988 | Ohashi |
| 4,765,649 A | 8/1988 | Ikemoto |
| 4,767,588 A | 8/1988 | Ito |
| 4,778,773 A | 10/1988 | Sukegawa |
| 4,797,823 A | 1/1989 | Ikemoto et al. |
| 4,801,156 A | 1/1989 | Escaravage |
| 4,809,183 A | 2/1989 | Eckert |
| 4,827,416 A | 5/1989 | Kawagoe et al. |
| 4,846,496 A | 7/1989 | Tanaka et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,002,141 A | 3/1991 | Loshbough et al. |
| 5,002,142 A | 3/1991 | Klosterhaus |
| 5,033,770 A | 7/1991 | Kamimura et al. |
| 5,058,017 A | 10/1991 | Adachi et al. |
| 5,066,041 A | 11/1991 | Kindermann et al. |
| 5,072,965 A | 12/1991 | Wada et al. |
| 5,085,458 A | 2/1992 | Kii et al. |
| 5,088,040 A | 2/1992 | Matsuda et al. |
| 5,089,967 A | 2/1992 | Haseda et al. |
| 5,097,917 A | 3/1992 | Serizawa et al. |
| 5,136,513 A | 8/1992 | Sol |
| 5,159,553 A | 10/1992 | Karnopp et al. |
| 5,163,319 A | 11/1992 | Spies et al. |
| 5,175,686 A | 12/1992 | Oda et al. |
| 5,189,920 A | 3/1993 | Martinez |
| 5,200,896 A | 4/1993 | Sato et al. |
| 5,208,749 A | 5/1993 | Adachi et al. |
| 5,217,248 A | 6/1993 | Reast |
| 5,224,765 A | 7/1993 | Matsuda |
| 5,228,757 A | 7/1993 | Ito et al. |
| 5,230,396 A | 7/1993 | Yasui |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,265,481 A | 11/1993 | Sonderegger et al. |
| 5,274,576 A | 12/1993 | Williams |
| 5,278,761 A | 1/1994 | Ander et al. |
| 5,282,134 A | 1/1994 | Gioutsos et al. |
| 5,297,646 A | 3/1994 | Yamamura et al. |
| 5,307,274 A | 4/1994 | Takata et al. |
| 5,311,431 A | 5/1994 | Cao et al. |
| 5,311,956 A | 5/1994 | Sugiyama |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,396,423 A | 3/1995 | Fujimura |
| 5,408,411 A | 4/1995 | Nakamura et al. |
| 5,434,782 A | 7/1995 | Henry |
| 5,438,515 A | 8/1995 | Miichi et al. |
| 5,446,658 A | 8/1995 | Pastor et al. |
| 5,455,770 A | 10/1995 | Hadeler et al. |
| 5,490,063 A | 2/1996 | Genise |
| 5,510,989 A | 4/1996 | Zabler et al. |
| 5,513,108 A | 4/1996 | Kishimoto et al. ............. 701/38 |
| 5,515,277 A | 5/1996 | Mine |
| 5,548,536 A | 8/1996 | Ammon |
| 5,549,328 A | 8/1996 | Cubalchini |
| 5,560,688 A | 10/1996 | Schappler et al. |
| 5,576,957 A | 11/1996 | Asanuma et al. |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,684,698 A | 11/1997 | Fuji |
| 5,684,702 A | 11/1997 | Phillips et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,719,790 A | 2/1998 | Lohrenz et al. |
| 5,720,533 A | 2/1998 | Pastor et al. |
| 5,722,743 A | 3/1998 | Sano |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,740,877 A | 4/1998 | Sasaki |
| 5,742,918 A | 4/1998 | Ashrafi et al. |
| 5,742,919 A | 4/1998 | Ashrafi et al. |
| 5,762,406 A | 6/1998 | Yasui et al. |
| 5,774,819 A | 6/1998 | Yamamoto |
| 5,782,543 A | 7/1998 | Monzaki et al. |
| 5,787,375 A | 7/1998 | Madau et al. |
| 5,797,663 A | 8/1998 | Kawaguchi et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody |
| 5,842,143 A | 11/1998 | Lohrenz et al. |
| 5,857,160 A | 1/1999 | Dickinson et al. |
| 5,857,535 A | 1/1999 | Brooks |
| 5,869,943 A | 2/1999 | Nakashima et al. |
| 5,878,357 A | 3/1999 | Sivashankar et al. |
| 5,890,084 A | 3/1999 | Halasz et al. |
| 5,893,896 A | 4/1999 | Imamura et al. |
| 5,925,083 A | 7/1999 | Ackermann |
| 5,926,087 A | 7/1999 | Busch |
| 5,931,546 A | 8/1999 | Nakashima et al. |
| 5,931,887 A | 8/1999 | Hac |
| 5,935,181 A | 8/1999 | Iwasaki |
| 5,941,920 A | 8/1999 | Schubert |
| 5,944,137 A | 8/1999 | Moser et al. |
| 5,944,392 A | 8/1999 | Tachihata et al. |
| 5,944,763 A | 8/1999 | Iwasaki |
| 5,946,644 A | 8/1999 | Cowan et al. |
| 5,948,028 A | 9/1999 | Raad et al. |
| 5,964,819 A | 10/1999 | Naito |
| 5,965,808 A | 10/1999 | Normann |
| 5,971,503 A | 10/1999 | Joyce et al. |
| 6,002,974 A | 12/1999 | Schiffman |
| 6,002,975 A | 12/1999 | Schiffman et al. |
| 6,017,044 A | 1/2000 | Kawagoe |
| 6,023,220 A | 2/2000 | Dobler et al. |
| 6,026,926 A | 2/2000 | Noro et al. |
| 6,038,495 A | 3/2000 | Schiffman |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |

| | | | | | | |
|---|---|---|---|---|---|---|
| 6,079,513 | A | 6/2000 | Nishizaki et al. | 6,438,464 B1 | 8/2002 | Woywod et al. |
| 6,081,761 | A | 6/2000 | Harada et al. | 6,456,194 B1 | 9/2002 | Carlson et al. |
| 6,085,133 | A | 7/2000 | Keuper et al. | 6,459,990 B1 | 10/2002 | McCall et al. |
| 6,085,860 | A | 7/2000 | Hackl et al. | 6,471,218 B1 | 10/2002 | Burdock et al. |
| 6,086,168 | A | 7/2000 | Rump | 6,477,480 B1 | 11/2002 | Tseng et al. |
| 6,089,344 | A | 7/2000 | Baughn et al. | 6,491,353 B2 | 12/2002 | Hackl |
| 6,104,284 | A | 8/2000 | Otsuka | 6,496,758 B2 | 12/2002 | Rhode et al. ................. 701/1 |
| 6,121,873 | A | 9/2000 | Yamada et al. | 6,496,763 B2 | 12/2002 | Griessbach |
| 6,122,568 | A | 9/2000 | Madau et al. | 6,498,976 B1 | 12/2002 | Ehlbeck et al. |
| 6,122,584 | A | 9/2000 | Lin et al. | 6,502,023 B1 | 12/2002 | Fukada |
| 6,129,172 | A | 10/2000 | Yoshida | 6,523,637 B1 | 2/2003 | Nakano et al. |
| 6,141,604 | A | 10/2000 | Mattes et al. | 6,526,342 B1 | 2/2003 | Burdock et al. |
| 6,141,605 | A | 10/2000 | Joyce | 6,529,803 B2 | 3/2003 | Meyers et al. |
| 6,144,904 | A | 11/2000 | Tseng | 6,529,811 B2 | 3/2003 | Watson et al. |
| 6,149,251 | A | 11/2000 | Wuerth et al. | 6,542,073 B2 | 4/2003 | Yeh et al. |
| 6,161,905 | A | 12/2000 | Hac et al. | 6,542,792 B2 | 4/2003 | Schubert et al. |
| 6,167,357 | A | 12/2000 | Zhu | 6,547,022 B2 | 4/2003 | Hosomi et al. |
| 6,169,939 | B1 | 1/2001 | Raad et al. | 6,547,343 B1 | 4/2003 | Hac |
| 6,169,946 | B1 | 1/2001 | Griessbach | 6,553,284 B2 | 4/2003 | Holst et al. |
| 6,170,594 | B1 | 1/2001 | Gilbert | 6,554,293 B1 | 4/2003 | Fennel |
| 6,176,555 | B1 | 1/2001 | Semsey | 6,556,908 B1 | 4/2003 | Lu |
| 6,178,365 | B1 | 1/2001 | Kawagoe et al. | 6,559,634 B2 | 5/2003 | Yamada |
| 6,178,375 | B1 | 1/2001 | Breunig | 6,593,849 B2 | 7/2003 | Chubb |
| 6,179,310 | B1 | 1/2001 | Clare et al. | 6,598,946 B2 | 7/2003 | Nagae |
| 6,179,394 | B1 | 1/2001 | Browalski et al. | 6,600,414 B2 | 7/2003 | Foo et al. |
| 6,184,637 | B1 | 2/2001 | Yamawaki et al. | 6,600,985 B2 | 7/2003 | Weaver |
| 6,185,485 | B1 | 2/2001 | Ashrafti et al. | 6,618,656 B2 | 9/2003 | Kueblbeck et al. |
| 6,185,497 | B1 | 2/2001 | Taniguchi et al. | 6,631,317 B2 | 10/2003 | Lu |
| 6,186,267 | B1 | 2/2001 | Hackl et al. | 6,637,543 B2 | 10/2003 | Card |
| 6,192,305 | B1 | 2/2001 | Schiffmann | 6,644,454 B2 | 11/2003 | Yamada et al. |
| 6,195,606 | B1 | 2/2001 | Barta et al. | 6,650,971 B2 | 11/2003 | Haas |
| 6,198,988 | B1 | 3/2001 | Tseng | 6,654,674 B2 | 11/2003 | Lu et al. |
| 6,202,009 | B1 | 3/2001 | Tseng | 6,657,539 B2 | 12/2003 | Yamamoto et al. |
| 6,202,020 | B1 | 3/2001 | Kyrtsos | 6,678,631 B2 | 1/2004 | Schiffmann |
| 6,206,383 | B1 | 3/2001 | Burdock | 6,681,196 B2 | 1/2004 | Glaser et al. |
| 6,219,604 | B1 | 4/2001 | Dilger et al. | 6,681,881 B2 | 1/2004 | Andonian et al. |
| 6,223,114 | B1 | 4/2001 | Boros et al. | 6,694,225 B2 | 2/2004 | Aga et al. |
| 6,226,579 | B1 | 5/2001 | Hackl et al. | 6,698,542 B2 | 3/2004 | Nishizaki et al. |
| 6,227,482 | B1 | 5/2001 | Yamamoto | 6,704,631 B2 | 3/2004 | Winner et al. |
| 6,232,875 | B1 | 5/2001 | DeZorzi | 6,718,248 B2 | 4/2004 | Lu |
| 6,233,510 | B1 | 5/2001 | Platner et al. | 6,719,087 B2 | 4/2004 | Demerly |
| 6,236,916 | B1 | 5/2001 | Staub et al. | 6,725,140 B2 | 4/2004 | Lu et al. |
| 6,263,261 | B1 | 7/2001 | Brown et al. | 6,741,922 B2 | 5/2004 | Holler |
| 6,266,596 | B1 | 7/2001 | Hartman et al. | 6,745,624 B2 | 6/2004 | Porter |
| 6,272,420 | B1 | 8/2001 | Schramm et al. | 6,747,553 B2 | 6/2004 | Yamada et al. |
| 6,278,930 | B1 | 8/2001 | Yamada et al. | 6,756,890 B1 | 6/2004 | Schramm et al. |
| 6,282,471 | B1 | 8/2001 | Burdock et al. | 6,766,875 B2 | 7/2004 | Yamamoto |
| 6,282,472 | B1 | 8/2001 | Jones et al. | 6,784,794 B1 | 8/2004 | McQuade |
| 6,282,474 | B1 | 8/2001 | Chou et al. | 6,799,092 B2 | 9/2004 | Lu |
| 6,290,019 | B1 | 9/2001 | Kolassa et al. | 6,804,584 B2 | 10/2004 | Tseng et al. ................. 701/1 |
| 6,292,734 | B1 | 9/2001 | Murakami et al. | 6,816,764 B2 | 11/2004 | Coelingh et al. |
| 6,292,759 | B1 | 9/2001 | Schiffmann | 6,834,218 B2 | 12/2004 | Meyers et al. |
| 6,311,111 | B1 | 10/2001 | Leimbach et al. | 6,856,868 B1 | 2/2005 | Le et al. |
| 6,314,329 | B1 | 11/2001 | Madau et al. | 6,873,897 B2 | 3/2005 | Faye et al. |
| 6,315,373 | B1 | 11/2001 | Yamada et al. | 7,020,552 B2 * | 3/2006 | Park ........................ 701/45 |
| 6,321,141 | B1 | 11/2001 | Leimbach | 7,239,952 B2 | 7/2007 | Bauer ....................... 701/70 |
| 6,324,445 | B2 | 11/2001 | Tozu et al. | 2001/0008986 A1 | 7/2001 | Brown et al. ................ 701/1 |
| 6,324,446 | B1 | 11/2001 | Brown et al. ................. 701/1 | 2002/0082749 A1 | 6/2002 | Meyers et al. ............... 701/1 |
| 6,324,458 | B1 | 11/2001 | Takagi et al. | 2002/0095244 A1 | 7/2002 | Rhode et al. ................ 701/1 |
| 6,330,522 | B1 | 12/2001 | Takeuchi | 2002/0109310 A1 | 8/2002 | Lim |
| 6,332,104 | B1 | 12/2001 | Brown et al. | 2003/0055549 A1 | 3/2003 | Barta et al. |
| 6,338,012 | B2 | 1/2002 | Brown et al. | 2003/0065430 A1 | 4/2003 | Lu et al. .................... 701/45 |
| 6,349,247 | B1 | 2/2002 | Schramm et al. | 2003/0100979 A1 | 5/2003 | Lu et al. .................... 701/36 |
| 6,351,694 | B1 | 2/2002 | Tseng et al. | 2003/0109939 A1 | 6/2003 | Burgdorf et al. |
| 6,352,318 | B1 | 3/2002 | Hosomi et al. | 2003/0130775 A1 | 7/2003 | Lu et al. .................... 701/36 |
| 6,356,188 | B1 | 3/2002 | Meyers et al. | 2003/0171865 A1 | 9/2003 | Moser |
| 6,360,147 | B1 | 3/2002 | Lee | 2003/0182025 A1 | 9/2003 | Tseng et al. |
| 6,363,309 | B1 | 3/2002 | Irie et al. | 2004/0010383 A1 | 1/2004 | Lu |
| 6,366,844 | B1 | 4/2002 | Woywod et al. | 2004/0019418 A1 | 1/2004 | Lu |
| 6,370,938 | B1 | 4/2002 | Leimbach | 2004/0026158 A1 | 2/2004 | Rieth et al. |
| 6,394,240 | B1 | 5/2002 | Barwick | 2004/0041358 A1 | 3/2004 | Hrovat |
| 6,397,127 | B1 | 5/2002 | Meyers et al. | 2004/0064237 A1 | 4/2004 | Lu et al. |
| 6,409,286 | B1 | 6/2002 | Fennel | 2004/0064246 A1 | 4/2004 | Lu |
| 6,419,240 | B1 | 7/2002 | Burdock et al. | 2004/0119335 A1 | 6/2004 | Szabo et al. |
| 6,424,897 | B1 | 7/2002 | Mattes et al. | 2004/0133338 A1 | 7/2004 | Verhagen et al. .......... 701/124 |
| 6,427,102 | B1 | 7/2002 | Ding | 2004/0158368 A1 | 8/2004 | Haas |
| 6,428,118 | B1 | 8/2002 | Blosch | 2004/0162654 A1 | 8/2004 | Lu et al. |
| 6,433,681 | B1 | 8/2002 | Foo et al. | 2004/0217647 A1 | 11/2004 | Einig |
| 6,438,463 | B1 | 8/2002 | Tobaru et al. | 2004/0254703 A1 | 12/2004 | Traechtler et al. ........... 701/38 |

| | | | |
|---|---|---|---|
| 2004/0254707 A1 | 12/2004 | Lu | |
| 2005/0033486 A1 | 2/2005 | Schmitt et al. | |
| 2005/0137767 A1 | 6/2005 | Goebels et al. | 701/38 |
| 2005/0222727 A1 | 10/2005 | Hille et al. | 701/38 |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| EP | 1 046 571 | 4/2000 |
| EP | 1 197 409 | 9/2001 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| JP | 11321603 | 11/1999 |
| SU | 816849 | 3/1981 |
| WO | PCT/DE02/02536 | 8/2001 |
| WO | WO 02/20318 | 3/2002 |
| WO | WO 03008242 A1 | 1/2003 |

OTHER PUBLICATIONS

U.S. Appl. No. 10/459,697, filed Jun. 11, 2003, Lu.

A method for reducing on-road rollovers—anti-rollover braking, Thomas J. Wielenga, Dynamotive, LLC, International Congress and Exposition, Detroit, Michigan, Mar. 1-4, 1999.

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12$^{th}$ International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

Chen, Bo-Chiuan, Peng, Huei; "A Real-time Rollover Threat Index for Sports Utility Vehicles", Proceedings of the American Control Conference, San Diego, CA, Jun. 1999.

* cited by examiner

SYSTEM AND METHOD FOR DYNAMICALLY DETERMINING VEHICLE LOADING AND VERTICAL LOADING DISTANCE FOR USE IN A VEHICLE DYNAMIC CONTROL SYSTEM

CROSS REFERENCE

This application is a divisional of U.S. application Ser. No. 10/966,395 filed on Oct. 15, 2004, now issued as U.S. Pat. No. 7,668,645, herein incorporated by reference.

TECHNICAL FIELD

The present invention generally relates to a control apparatus for controlling a system of an automotive vehicle in response to sensed dynamic behavior. The present invention more specifically relates to a method and apparatus for determining vehicle loading and a vertical loading distance and/or the impact of such vehicle loading on the roll dynamics of the vehicle.

BACKGROUND

Recently, vehicle roll stability control (RSC) schemes, i.e., U.S. Pat. No. 6,324,446, have been proposed to address the issue of friction-induced rollovers. RSC system includes a variety of sensors sensing vehicle states and a controller that controls a distributed brake pressure to reduce a tire force so the net moment of the vehicle is counter to the roll direction.

During an event causing the vehicle to roll, the vehicle body is subject to a roll moment due to the coupling of the lateral tire force and the lateral acceleration applied to the center of gravity of the vehicle body. This roll moment causes suspension height variation, which in turn results in a vehicle relative roll angle (also called chassis roll angle or suspension roll angle). The relative roll angle is an important variable that is used as an input to the activation criteria and to construct the feedback brake pressure command, since it captures the relative roll between the vehicle body and the axle. The sum of such a chassis roll angle and the roll angle between wheel axle and the road surface (called wheel departure angle) provides the roll angle between the vehicle body and the average road surface, which is one of the important variables feeding back to the roll stability control module.

Such a chassis roll angle can be calculated as in U.S. Pat. No. 6,556,908 using the lateral acceleration of the center of gravity of the vehicle body, the roll angular acceleration, and the roll angular velocity, together with vehicle parameters such as the sprung mass, the vehicle body roll moment of inertia, the roll stiffness and damping ratio of the suspensions and the anti-roll-bars, and the distance between the center of gravity of the vehicle body and the floor of the vehicle body. The disclosure of U.S. Pat. No. 6,556,908 is hereby incorporated by reference.

One problem with using these parameters in the computation is that the aforementioned relative roll angle may vary with the vehicle operating conditions. For example, a 150 pound roof loading for a typical SUV with a curb weight of 5000 pounds may cause more than 30% error in relative roll angle calculations if computed assuming no roof load. From the vehicle mass point of view, although a 150 pound roof loading accounts for only a 3% mass variation over the vehicle curb weight, it could account for a 30% error in the chassis roll computation, which is ten times larger. If the above parameters are fixed at certain nominal values in the RSC system, it is conceivable that optimal control performance may not be achieved under a different loading condition. For example, if the relative roll angle is computed with nominal vehicle loading condition assumptions, without considering roof loading, the relative roll angle may be under estimated for vehicles with roof loadings, which results in a reduced control. That is, the control system may not be as effective as desired. On the other hand, if the relative roll angle is computed with maximum roof loading, it may be over estimated for vehicles without roof loadings causing unintended control. That is, the control system may become too sensitive or intrusive. Therefore, in order to improve the overall performance of the RSC system, it may be desirable to estimate and update the vehicle parameters periodically or adaptively adjust in real time based on the detected roof loading.

Certain schemes for obtaining vehicle parameters have been disclosed. For example, in U.S. Pat. No. 4,548,079, a method is disclosed for determining vehicle mass directly using engine output torque and vehicle acceleration. Similarly, in U.S. Pat. No. 5,490,063, push force is determined from the driveline torque and gear ratio to obtain vehicle mass. In U.S. Pat. No. 6,167,357, instead of calculating vehicle mass directly, a recursive least square (RLS) algorithm is proposed to estimate both vehicle mass and aerodynamic coefficient online. The latter method is considered to be more reliable since it recursively adjusts for estimation error of the previous estimates. Furthermore, the use of vehicle acceleration, which is usually very noisy, is avoided. The mass estimation schemes proposed in the above-cited patents may not accurately indicate changes to parameters that impact the roll dynamics of the vehicle. For example, a 150 pound roof loading on a 5000 pound SUV, i.e., 3% mass change, might be undetectable in the above schemes due to the potential error in the engine torque, which usually is much larger than 3%. Other error sources include the road grade, the tire rolling radius change due to tire pressure drop and due to the vehicle loading variations and the vehicle drag.

The above schemes focus mainly on large mass variations which may have significant influences on the vehicle longitudinal dynamics and vehicle fuel consumption. They do not differentiate if the vehicle mass change is due to a floor loading or due to a roof loading. However, in our case, the roof loading causes much more significant roll motion parameter changes than does the same amount of floor loading. That is, there is a need to detect not only the amount of loading (maybe small), but also the location of the loading (the vertical and longitudinal distance of the loading with respect to the vehicle floor or the center of gravity of the vehicle body, for example).

That is, the prior art does not address vehicle inertia and mass properties with respect to the vehicle body roll and lateral dynamics. The estimation methodologies suggested in the literature have been considering the vehicle longitudinal dynamics and are not appropriate for an RSC system where the lateral and roll dynamics are more important than longitudinal dynamics.

Furthermore, the other parameters that affect vehicle body roll and lateral dynamics, such as the roll stiffness and damping in the suspensions and the total center of gravity height of the vehicle body with respect to the vehicle floor, the roll moment of inertia, have not been estimated and/or considered in the prior art.

Therefore, there is a need for a technique that can detect or adaptively update the vehicle parameters, including vehicle loading and loading location, the roll moment of inertia, in order to refine and improve a vehicle control system relating to roll stability control functions.

SUMMARY OF THE INVENTION

It is therefore one object of the invention to provide a system for quantitative characterization of the chassis roll of a vehicle that may be used in conjunction with the roll stability control (RSC) system of the vehicle to determine accurate vehicle roll trending of vehicles with varying inertia parameters due to various loading conditions, adaptively adjust the computation of the chassis roll angle, and/or adaptively adjust the activation criteria for the roll stability control function. More specifically, the present invention seeks to determine the roll condition of a vehicle in response to an additional mass and height of the mass onboard the vehicle so as to determine if a small mass change onboard the vehicle may significantly impact the roll dynamics of the vehicle, such as in the case of a change in the vehicle's roof load. The control system of the vehicle can then make a determination as to how to command appropriate actuators onboard the vehicle in an increasing control sense to thereby more aggressively correct a potential rollover condition, or in a desensitizing control sense to thereby reduce the amount of actuator actuation so as to correct potential false or inappropriate actuator activation.

In one aspect of the invention, a method of controlling a vehicle includes the step(s) of determining a roll gradient, a roll acceleration coefficient, and/or a roll rate coefficient. That is, the roll acceleration coefficient, the roll gradient, and the roll rate coefficient may be used simultaneously, or in various combinations thereof, to control a safety system on the vehicle.

In a further aspect of the invention, a method of controlling a safety device on a vehicle includes the steps of determining a composite parameter called a roll gradient, determining another composite parameter called a roll acceleration coefficient, determining an added mass and a height of the added mass on the vehicle from the roll gradient and the roll acceleration coefficient, and controlling the safety device or system in response to and/or according to the added mass and its height on the vehicle.

In another aspect of the invention, a control system for an automotive vehicle includes a roll rate sensor for generating a roll rate signal, a lateral acceleration sensor for generating a lateral acceleration signal, a longitudinal acceleration sensor for generating a longitudinal acceleration signal, and a yaw rate sensor for generating a yaw rate signal. A safety system and the sensors are coupled to a controller. The controller determines an added mass and a height of the added mass on the vehicle from the roll rate, the lateral acceleration, the longitudinal acceleration, and the yaw rate and then controls the safety system on the vehicle in response to the added mass and its height on the vehicle.

In another aspect of the invention, a method of controlling a safety device on a vehicle includes the steps of determining different roll conditions onboard the vehicle that are differentiated through determining an added mass and a height of the added mass on the vehicle, and then controlling the safety device or system in response or according to the determined roll condition, which may be caused by an aggressive driving maneuver and enhanced by the added mass at its given height on the vehicle.

One advantage of the invention is that various vehicle loading conditions can be detected and determined very accurately. Such is true even though vehicle loading conditions (for example, roof loadings) are usually a fraction of a vehicle's total mass (for example, 3% to 6% of the vehicle's curb weight), are difficult to detect when using methods largely involving longitudinal vehicle dynamics, and may cause large (for example, more than 30%) changes in the vehicle's chassis roll angle.

Other advantages and features of the present invention will become apparent when the detailed written description of a preferred embodiment of the invention set forth below is viewed in conjunction with both the attached drawing figures and the appended claims.

DETAILED DESCRIPTION

Figure 1:
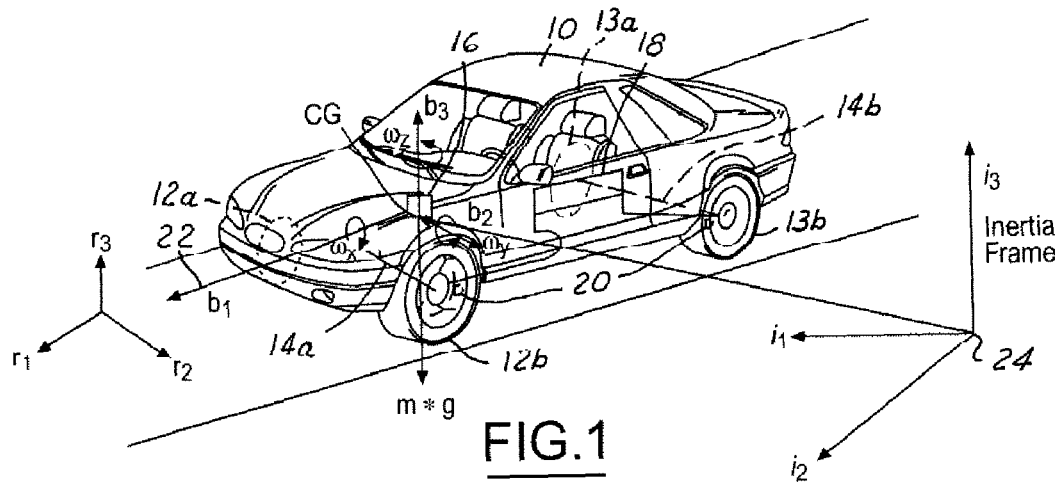
FIG. 1 is a diagrammatic view of a vehicle with variable vectors and coordinate frames according to the present invention.

In the following figures, the same reference numerals will be used to identify the same components. The present invention may be used in conjunction with a rollover control system for a vehicle. The present invention may also be used with a deployment device such as an airbag or active roll bar. The present invention will be discussed below in terms of preferred embodiments relating to an automotive vehicle moving in a three-dimensional road terrain. The present invention is described with respect to determining an added mass and height of the mass. As will be described below the added mass and height may not be directly determined, rather by adaptively updating a roll gradient value, roll acceleration coefficient, roll moment of inertia and/or a roll rate coefficient, the effects of added mass and the height may be included in those values. Such values may also be referred to as an "adaptive" roll gradient, an "adaptive" roll acceleration coefficient, an "adaptive" roll moment of inertia and an "adaptive" roll rate coefficient. The various roll parameters may be referred to as adaptively determined, meaning that such values may change due to a changing mass or load over time. That is, such values are not fixed as has been done in previous systems.

It should also be noted that while one of the roll gradient, roll acceleration coefficient and roll rate coefficient may be adaptively determined, the other two values may not be adaptive.

Referring to FIG. 1, an automotive vehicle 10 with a safety system of the present invention is illustrated with the various forces and moments thereon during a rollover condition. Vehicle 10 has front right (FR) and front left (FL) wheel/tires 12A and 12B and rear right (RR) wheel/tires 13A and rear left (RL) wheel/tires 13B, respectively. The vehicle 10 may also have a number of different types of front steering systems 14$a$ and rear steering systems 14$b$, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with safety systems including active/semi-active suspension systems, anti-roll bar, or airbags or other safety devices deployed or activated upon sensing predetermined dynamic conditions of the vehicle.

The sensing system 16 is coupled to a control system 18. The sensing system 16 may comprise many different sensors including the sensor set typically found in a roll stability control or a rollover control system (including lateral accelerometer, yaw rate sensor, steering angle sensor and wheel speed sensor which are equipped for a traditional yaw stability control system) together with a roll rate sensor and a longitudinal accelerometer. The various sensors will be further described below. The sensors may also be used by the control system in various determinations such as to determine a lifting event, determine a height and position of a mass, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x,y and z shown in FIG. 1. As those skilled in the art will recognize, the frame from $b_1, b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

The angular rate sensors and the accelerometers may be mounted on the vehicle car body along the body frame directions $b_1, b_2$ and $b_3$ which are the x-y-z axes of the sprung mass of the vehicle.

The longitudinal acceleration sensor is mounted on the car body located at the center of gravity, with its sensing direction along Maxis, whose output is denoted as $a_x$. The lateral acceleration sensor is mounted on the car body located at the center of gravity, with its sensing direction along $b_2$ axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$ and $\theta_{ybr}$, which are also called the relative Euler angles (i.e., relative roll and relative pitch angles, respectively).

Figure 2:
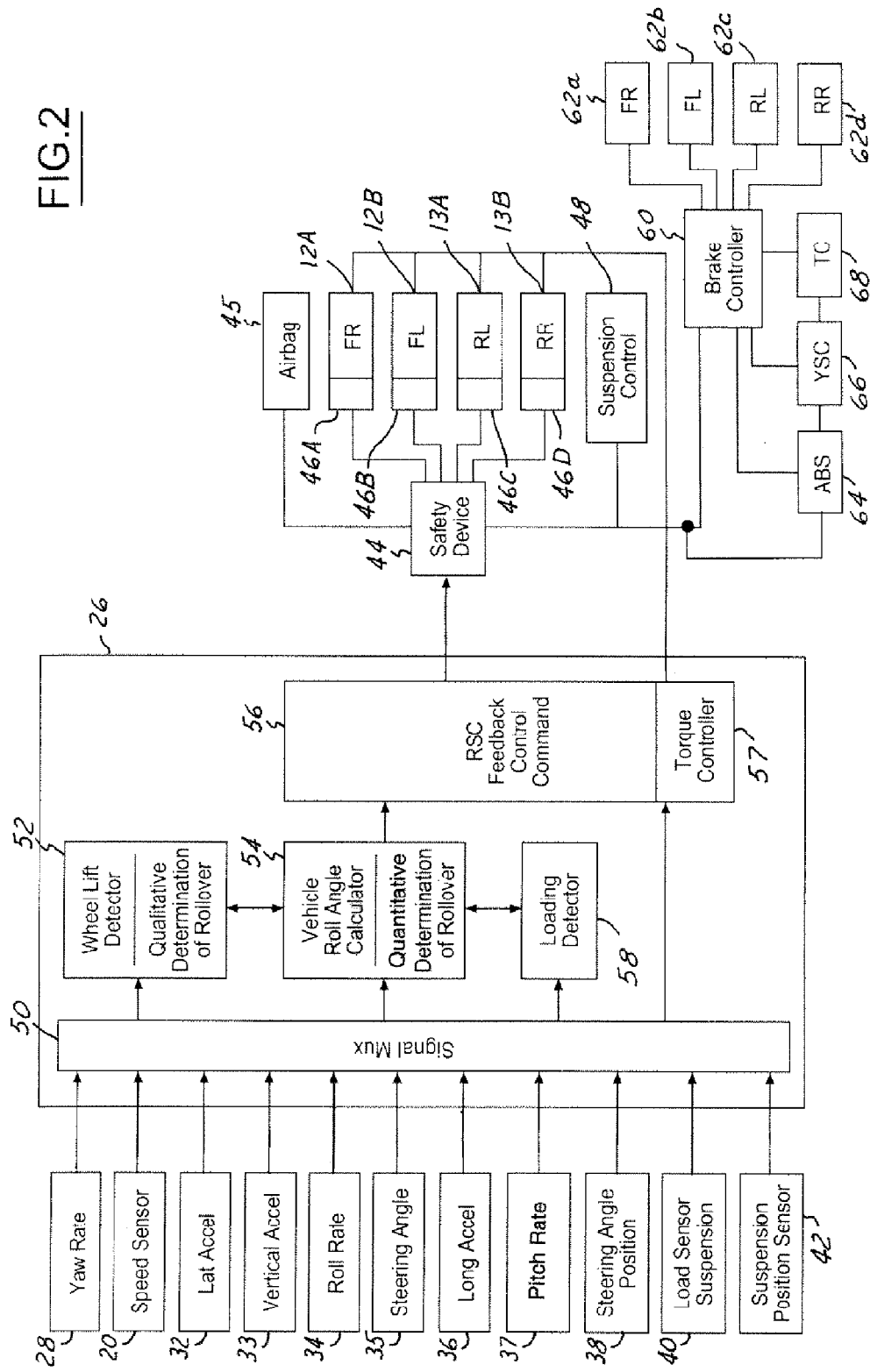
FIG. 2 is a block diagram of a stability system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch rate sensor 37, steering angle (of the wheels or actuator) position sensor 38, suspension load sensor 40 and suspension position sensor 42. It should be noted that various combinations and sub-combinations of the sensors may be used.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-42 may be used in a commercial embodiment. Safety device 44 may control an airbag 45 or a steering actuator 46A-46D at one or more of the wheels 12A, 12B, 13A, 13B of the vehicle. Also, other vehicle components such as a suspension control 48 may be used to adjust the suspension to prevent rollover.

Roll angular rate sensor 34 and pitch rate sensor 37 may sense the roll condition or lifting of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 34 may also use a combination of sensors such as proximity sensors to make a roll rate determination.

Roll rate sensor 34 and pitch rate sensor 37 may also sense the roll condition or lifting based on sensing the linear or rotational relative displacement or displacement velocity of one or more of the suspension chassis components. This may be in addition to or in combination with suspension position sensor 42. The suspension position sensor 42, roll rate sensor 34 and/or the pitch rate sensor 37 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or lifting may also be sensed by sensing directly or estimating the force or torque associated with the loading condition of one or more suspension or chassis components including a pressure transducer in an act of air suspension, a shock absorber sensor such as a load sensor 40, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor. The yaw rate sensor 28, the roll rate sensor 34, the lateral acceleration sensor 32, and the longitudinal acceleration sensor 36 may be used together to determine that the wheel has lifted. Such sensors may be used to determine wheel lift or estimate normal loading associated with wheel lift. These are passive methods as well.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, the vertical acceleration sensor 33, a vehicle longitudinal acceleration sensor 36, lateral or vertical speed sensor including a wheel-based speed sensor 20, a radar-based speed sensor, a sonar-based speed sensor, a laser-based speed sensor or an optical-based speed sensor.

Controller 26 may include a signal multiplexer 50 that is used to receive the signals from the sensors 28-42. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57. Vehicle roll angle calculator 54 is described in U.S. Provisional Applications 60/400,376 and 60/400,172, and in U.S. patent application Ser. No. 10/459,697, the disclosures of which are incorporated herein by reference.

A loading detector 58 may also be included in controller 26. The loading detector 58 may be used to determine an additional mass of the vehicle and a distance of the mass as will be described below.

In the preferred embodiment, the sensors are located at the center of gravity of the vehicle. Those skilled in the art will recognize that the sensor may also be located off the center of gravity and translated equivalently thereto.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position and/or braking of the wheels.

Safety device 44 may be coupled to a brake controller 60. Brake controller 60 controls the amount of brake torque at a front right brake 62a, front left brake 62b, rear left brake 62c and a rear right brake 62d. Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy such as modifying the brake force.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

The roll condition of a vehicle can be characterized by the relative roll angle between the vehicle body and the wheel axle and the wheel departure angle (between the wheel axle and the average road surface). Both the relative roll angle and the wheel departure angle may be calculated in relative roll angle estimation module by using the roll rate and lateral acceleration sensor signals. If both the relative roll angle and the wheel departure angles are large enough, the vehicle may be in either single wheel lifting or double wheel lifting. On the other hand, if the magnitude of both angles is small enough, the wheels are likely all grounded. In case that both of them are not small and the double wheel lifting condition is detected or determined, the sum of those two angles will be used by the feedback control module to compute the desired actuation command for achieving rollover control performance.

The roll condition of a vehicle can be characterized by rolling radius-based wheel departure roll angle, which captures the angle between the wheel axle and the average road surface through the dynamic rolling radii of the left and right wheels when both of the wheels are grounded. Since the computation of the rolling radius is related to the wheel speed and the linear velocity of the wheel, such rolling-radius based wheel departure angle will assume abnormal values when there are large wheel slips. This happens when a wheel is lifted and there is torque applied to the wheel. Therefore, if this rolling radius-based wheel departure angle is increasing rapidly, the vehicle might have lifted wheels. Small magnitude of this angle indicates the wheels are all grounded.

The roll condition of the vehicle can be seen indirectly from the wheel longitudinal slip. If during a normal braking or driving torque the wheels at one side of the vehicle experience increased magnitude of slip, then the wheels of that side are losing longitudinal road torque. This implies that the wheels are either driven on a low mu surface or lifted up. The low mu surface condition and wheel-lifted-up condition can be further differentiated based on the chassis roll angle computation, i.e., in low mu surface, the chassis roll angle is usually very small. Hence, an accurate determination of chassis roll is desired.

The roll condition of the vehicle can be characterized by the normal loading sustained at each wheel. Theoretically, when a normal loading at a wheel decreases to zero, the wheel is no longer contacting the road surface. In this case a potential rollover is underway. Large magnitude of this loading indicates that the wheel is grounded. Normal loading is a function of the calculated chassis roll and pitch angles. Hence, an accurate determination of chassis roll and pitch angles is desired.

The roll condition can be identified by checking the actual road torques applied to the wheels and the road torques, which are needed to sustain the wheels when they are grounded. The actual road torques can be obtained through torque balancing for each wheel using wheel acceleration, driving torque and braking torque. If the wheel is contacting the road surface, the calculated actual road torques must match or be larger than the torques determined from the nonlinear torques calculated from the normal loading and the longitudinal slip at each wheel.

The roll condition of a vehicle can be characterized by the chassis roll angle itself, i.e., the relative roll angle $\theta_{xr}$ between the vehicle body and the wheel axle. If this chassis roll angle is increasing rapidly, the vehicle might be on the edge of wheel lifting or rollover. Small magnitude of this angle indicates the wheels are not lifted or are all grounded. Hence, an accurate determination of the chassis roll angle is beneficial for determining if the vehicle is in non-rollover events.

The roll condition of a vehicle can also be characterized by the roll angle between the wheel axle and the average road surface, this is called wheel departure angle. If the roll angle is increasing rapidly, the vehicle has lifted wheel or wheels and aggressive control action needs to be taken in order to prevent the vehicle from rolling over. Small magnitude of this angle indicates the wheels are not lifted.

The center of gravity C is also illustrated with nominal mass M. A roll axis is also illustrated at a distance D from the center of gravity. $a_y$ is the lateral acceleration.

Figure 3:
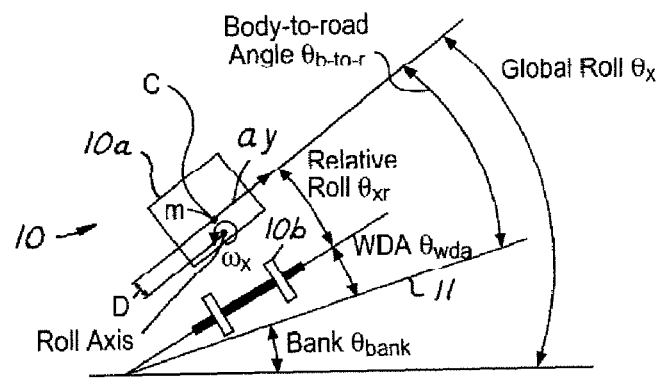
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll angle (as in U.S. Pat. No. 6,631,317 which is incorporated by reference herein). If all things were slowly changing without drifts, errors or the like, the linear bank angle and reference road bank angle terms would be equivalent.

Figure 4:
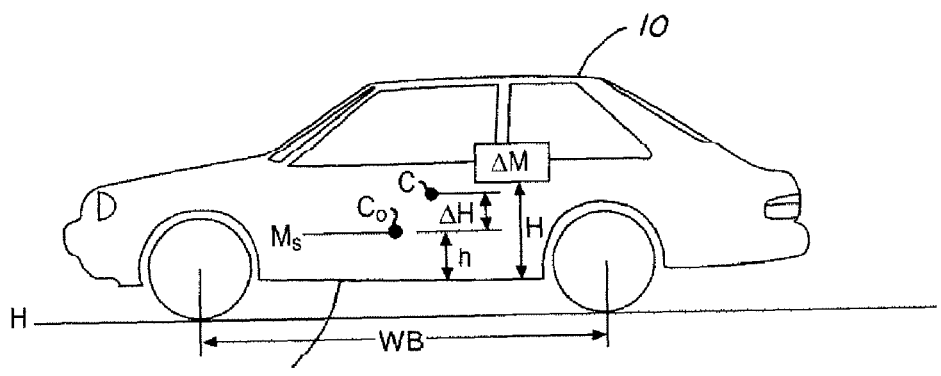
FIG. 4 is a side view of an automotive vehicle illustrating various variables thereon.
Figure 5:
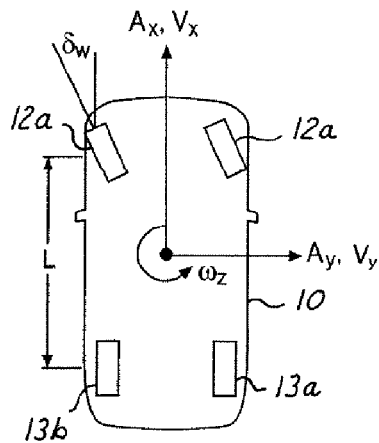
FIG. 5 is a top view of an automotive vehicle having variables used in the following calculations thereon.

Referring now to FIGS. 4 and 5, an automotive vehicle 10 is illustrated with various parameters illustrated thereon. A change in mass ΔM is illustrated relative to nominal center of gravity $C_0$. The center of gravity moves to C and the added mass ΔM is added thereto. The change in mass or load ΔM is positioned at a distance H above the load floor 80. The nominal center of gravity $C_0$ is located at position h above the load floor 80. The distance between the new center of gravity and the nominal center of gravity $C_0$ is ΔH.

The longitudinal acceleration is denoted by $a_x$ whereas the longitudinal velocity is denoted $v_x$. The lateral acceleration and lateral velocity is denoted by $a_y, v_y$ respectively. The steering wheel angle is denoted by $\delta_w$. The wheelbase of the vehicle is denoted by the symbol WB.

Figure 6:
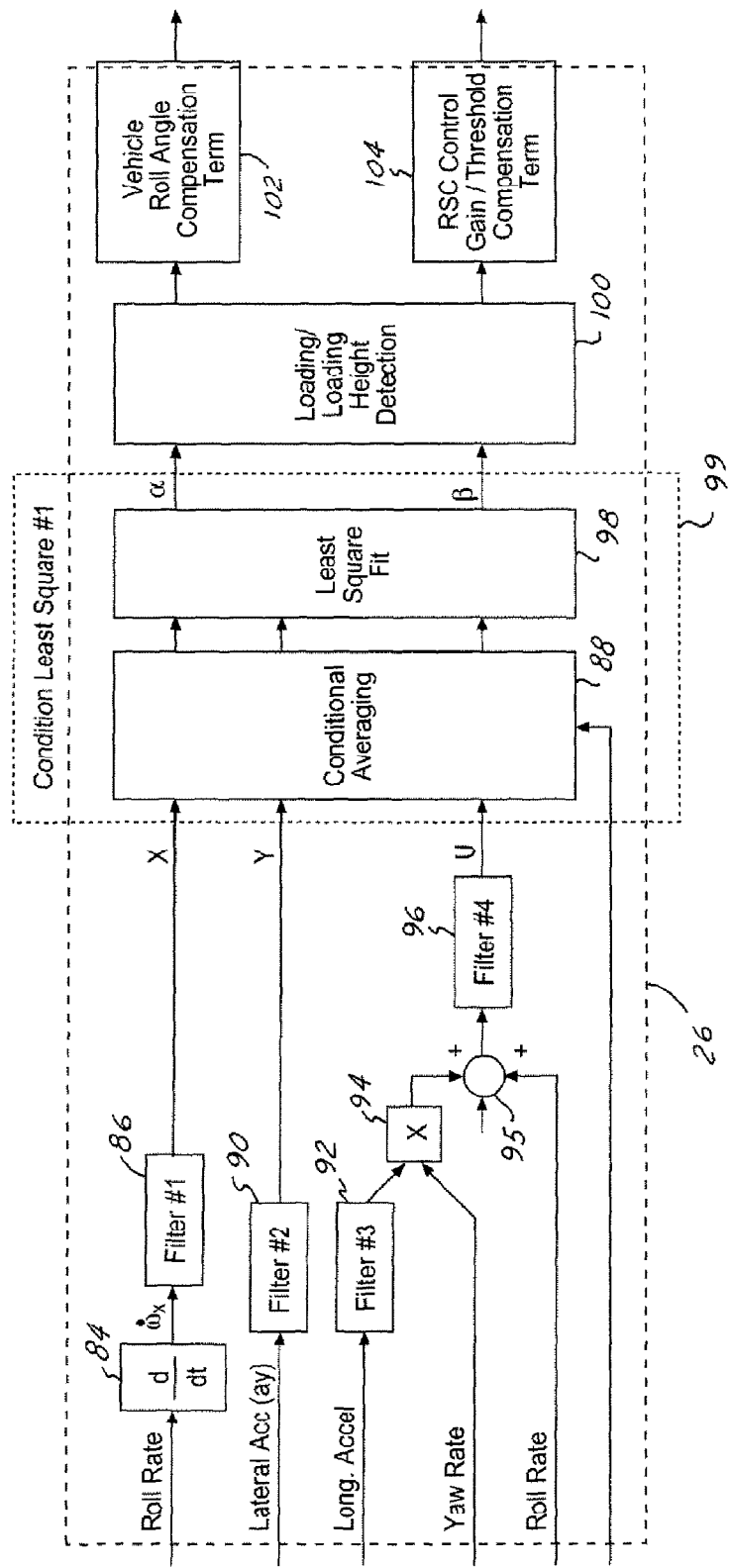
FIG. 6 is a block diagrammatic view of a controller according to a first embodiment of a least square method of the present invention.

Referring now to FIG. 6, controller 26 is illustrated in further detail. Controller 26 receives the various sensor signals, for example, the roll rate, lateral acceleration, longitudinal acceleration and yaw rate from the respective sensor signals. From the sensor signals, the loading height and amount of loading, the roll gradient, roll rate parameter, roll acceleration coefficient and roll inertia may be determined. These terms may be used to generate a vehicle roll angle compensation term and a roll stability control gain/threshold compensation term. Instead of determining the load and height of the load, an adaptive roll acceleration coefficient and an adaptive roll gradient that inherently have the load and height of the load therein may be determined. As mentioned above, these values in prior systems were fixed without regard to loading. Here they are adaptively determined to correspond to the loading condition. For example, these terms may increase the sensitivity of the system due to a higher center of mass. As will be further described below, the controller uses the roll rate signal and performs a derivative in box 84 to generate the roll acceleration signal $\dot{\omega}_x$, which is then filtered by the first filter 86 to generate the variable X, which is provided to a conditionality averaging box 88. The lateral acceleration signal is filtered in the second filter 90 and provided to the conditionality averaging box 88 illustrated as Y. The longitudinal acceleration is filtered in the third filter number 92 and provided to conditionality averaging box 88. As will be further described below, the conditional averaging box generates signals that are coupled to a least squares fit determination 98 which provides variables α and β. The α and β variables are provided to a loading/loading height detection block 100. The conditional averaging block and least squares fit block 98 illustrate a first conditional least square method illustrated by box 99. The loading/loading height detection block 100 generates a vehicle roll angle compensation term 102 and an RSC control gain/threshold compensation term 104.

Figure 7:
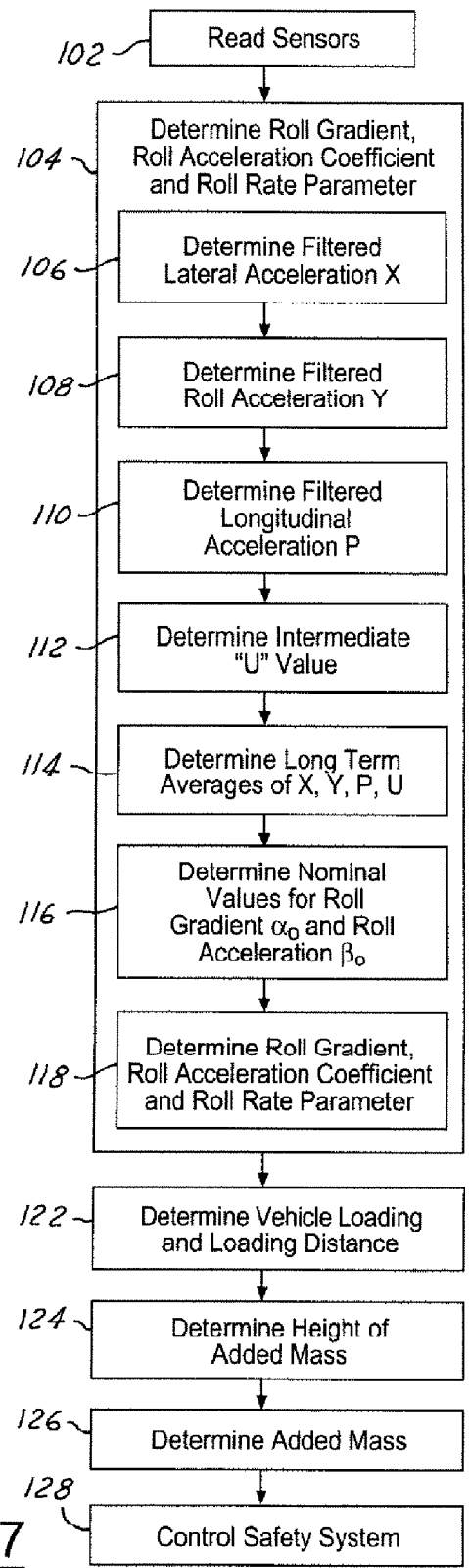
FIG. 7 is a flowchart of a method of operating the present invention.

Referring now to FIG. 7, the operation of the controller 26 is described in further detail. In step 102, the various sensors such as the roll rate sensor, the lateral acceleration sensor, longitudinal acceleration sensor and yaw rate sensor are read.

The roll signal for control is calculated as the $(\theta_x - \theta_{refbank})$, i.e., the subtraction of the reference bank angle from the global roll angle. The roll signal for control may be used to control the roll stability control system or other system or device.

As mentioned above, the various errors not limited to integration, calculation and drift may enter into the various signals at various times. Thus, in certain situations the wheel departure angle or the reference bank angle may not be accurate. The following description describes how these values can be updated in response to wheel lift/wheel grounded values.

In step 104, the roll gradient, roll acceleration coefficient computation and a roll rate parameter are determined.

There are two roll angle computations in the roll stability control: one is the relative roll angle as computed in U.S. Pat. No. 6,556,908 and the other is the global roll angle computation as computed in U.S. Pat. No. 6,631,317. U.S. Pat. Nos. 6,556,908 and 6,631,317 are incorporated by reference herein. The relative roll angle is a function of the lateral acceleration $a_y$, the roll acceleration $\dot{\omega}_x$, the roll rate $\omega_x$, the roll gradient α and the roll acceleration coefficient β and a roll rate coefficient η. That is, $$\theta_{xr} = f(a_y, \dot{\omega}_x; \alpha, \beta, \eta, \omega_x) \quad (1)$$

In z-transformation, $$\theta_{xr} = \alpha T_{roll}(z) a_y - \beta T_{roll}(z) \dot{\omega}_x \quad (2)$$

where $T_{roll}(z)$ is a filter which reflects the linear roll model of the vehicle, i.e., it includes the roll stiffness and damping effect due to suspension dynamics. Based on the roll dynamics, the following is true:

$$\theta_{xr} + \frac{D_{roll}}{K_{roll}} \dot{\theta}_{xr} = \alpha a_y + \beta \dot{\omega}_x$$

Performing a Laplace transform to convert this equation into the frequency domain equation, leads to the following computation $\theta_{xr}(s) = T_{roll}(s)(\alpha a_y(s) + \beta \dot{\omega}_x(s))$ where the transfer function $T_{roll}$ is $$T_{roll}(s) = \frac{1}{1 + \eta s}$$

with the roll rate coefficient η is defined as $$\eta = \frac{D_{roll}}{K_{roll}}$$

Using the algorithm shown in U.S. Pat. No. 6,631,317, the global roll angle $\theta_x$ (the roll angle of the vehicle body with respect to sea level) can be obtained through an anti-drift integration of the Euler roll angle velocity (which is different from the roll angular rate) and a roll reference signal through a steady-state recovery filter. On level ground when the vehicle does not have wheels in the air, such a calculated global roll angle is the same as the chassis roll angle when the vehicle roll dynamics is within its linear range (for example, the cornering acceleration of the vehicle is under 0.35 g).

Therefore, on level ground when the vehicle does not have wheels in the air and the vehicle has moderate cornering acceleration, the algorithm used to compute global roll angle as in U.S. Pat. No. 6,631,317 is a function of the roll rate $\omega_x$, the yaw rate $\omega_z$, the relative roll angle $\theta_{xr}$ and the relative pitch angle $\theta_{yr}$.

$$\theta_x = g(\omega_y, \omega_z, \theta_{xr}, \theta_{yr}) \quad (3)$$

In z-transformation, such a computation can be expressed as in the following format $$\theta_x = T_{adi}(z)[\omega_x + \omega_z \theta_{yr}] + T_{ssc}(z)\theta_{xr} \quad (4)$$

where $T_{adi}(z)$ is the so-called steady-state recovery filter which is used to recover the good low frequency portion of the roll angle removed by the anti-drift-integration filter. Here the relative roll angle (chassis roll angle) $\theta_{xr}$ is used to recover the true steady state value of the roll angle.

Notice that on level ground if the vehicle is driven without wheel lifting and with moderate cornering acceleration, the relative roll angle and the global roll angle are equal. Therefore, from equations (1) and (3) or (2) and (4), the relationships between the roll gradient $\alpha$, the roll acceleration coefficient $\beta$, and the roll rate coefficient $\eta$ may be found.

Although the computation of the roll gradient $\alpha$ and the roll acceleration coefficient $\beta$ is the main focus of this disclosure, the roll rate coefficient $\eta$ can be similarly determined. It can be adaptively determined independent of the determination $\alpha$ and $\beta$, or simultaneously determined together with $\alpha$ and $\beta$. Likewise $\alpha$ and $\beta$ can be independently determined.

Substituting (2) into (4), the following is obtained $$\theta_x = T_{adi}(z)[\omega_x + \omega_z \theta_{yr}] + \alpha \cdot T_{ssc}(z)T_{roll}(z)a_y - \beta T_{ssc}(z)T_{roll}(z)\dot{\omega}_x \quad (5)$$

where the relative pitch $\theta_{yr}$ is a function of the longitudinal acceleration and the pitch acceleration as in the following (see U.S. Pat. No. 6,556,908 for detail)

$$\theta_{yr} = m(a_x, \dot{\omega}_y; \kappa, \lambda) \quad (6)$$

and which can be further written as $$\theta_{yr} = \kappa T_{pitch}(z)a_x + \lambda T_{pitch}(z)\dot{\omega}_y \quad (7)$$

where $T_{pitch}(z)$ is a filter which reflects the linear pitch model of the vehicle, i.e., it includes the pitch stiffness and damping effect due to the vehicle suspension dynamics. $T_{pitch}(z)$ is different for vehicle deceleration and acceleration, i.e., $$T_{pitch}(z) = \begin{cases} T_{pitchacc}(z) & \text{if } a_x > 0 \\ T_{pitchdec}(z) & \text{if } a_x \leq 0 \end{cases} \quad (8)$$

and the same is true for the pitch gradient $\kappa$ and the pitch acceleration coefficient $\lambda$ $$\kappa = \begin{cases} \kappa_{acc} & \text{if } a_x > 0 \\ \kappa_{dec} & \text{if } a_x \leq 0 \end{cases} \quad (9)$$

$$\lambda = \begin{cases} \lambda_{acc} & \text{if } a_x > 0 \\ \lambda_{dec} & \text{if } a_x \leq 0 \end{cases}$$

If the pitch angular rate $\omega_y$ is not available, the above relative pitch $\theta_{yr}$ can be approximated as in the following $$\theta_{yr} \approx \kappa T_{pitch}(z)a_x \quad (10)$$

which is acceptably accurate at low frequency region (pitch acceleration term only provides high frequency contents).

By equating (2) and (5) on level ground, $\theta_x = \theta_{xr}$, the following equation is obtained $$\alpha X - \beta Y = U \quad (11)$$

where $$X = T_{roll}(z)(1 - T_{ssc}(z))a_y$$

$$Y = T_{roll}(z)(1 - T_{ssc}(z))\dot{\omega}_x$$

$$U = T_{adi}(z)[\omega_x + \omega_z \theta_{yr}] \quad (12)$$

The following is a summary of the computation algorithm.

In step 106, the filtered lateral acceleration X is determined in the following iterative equation $$X_k = d_{11}X_{k-1} + d_{12}X_{k-2} + d_{13}X_{k-3} + n_{11}a_{y_k} + n_{12}a_{y_{k-1}} + n_{13}a_{y_{k-2}} + n_{14}a_{y_{k-3}} \quad (13)$$

where $d_{1i}, n_{1i}$ for $i=1,2,3,4$ are the involved first set of the filter coefficients.

In step 108, the filtered roll acceleration Y as is determined in the following iterative equation $$Y_k = d_{11}Y_{k-1} + d_{12}Y_{k-2} + d_{13}Y_{k-3} + n_{11}\dot{\omega}_{x_k} + n_{12}\dot{\omega}_{x_{k-1}} + n_{13}\dot{\omega}_{x_{k-2}} + n_{14}\dot{\omega}_{x_{k-3}} \quad (14)$$

In step 110 the filtered roll angle velocity, which is the sum of the roll rate and the product of the relative pitch and yaw rate, may be calculated in the following iterative algorithm $$U = d_{21}U_{k-1} + d_{22}U_{k-2} + d_{23}U_{k-3} + n_{21}R_k + n_{22}R_{k-1} + n_{23}R_{k-2} + n_{24}R_{k-3} \quad (15)$$

where $R_k$ is the total roll angle velocity at the kth time instant on level ground, i.e., $$R_k = \omega_{x_k} + \omega_{z_k}\theta_{yr_k} \quad (16)$$

where $d_{2i}, n_{2i}$ for $i=1,2,3,4$ are the involved $2^{nd}$ set of the filter coefficients. If the approximation (10) is used, the total roll velocity on level ground can be approximated as in the following $$R_k \approx \omega_{x_k} + \kappa \omega_{z_k}T_{pitch}(z)a_{x_k} \quad (17)$$

Using the calculated filtered value $X_k, Y_k$ and $U_k$ at each sampling instant k, equation (11) can be used to potentially compute the unknown parameters of the roll gradient $\alpha$, the roll acceleration coefficient $\beta$ if the roll rate coefficient $\eta$ is determined independent of the determination of $\alpha$ and $\beta$. A more complicated method is needed in order to obtain $\alpha$, $\beta$ and $\eta$ simultaneously. One method to compute the unknown values $\alpha$ and $\beta$ in equation (11) is the so-called least-square method.

Since equation (11) is true when the vehicle is driven on level ground and the vehicle does not have any wheel in the air (4 tires are contacting the road), a conditional least-square (CLS) method is used. Two CLS's may be used. The first CLS method conduct $\alpha$ and $\beta$ parameter updating after a fixed number of conditional samples, while the second method updates $\alpha$ and $\beta$ and resets a covariance matrix at each conditional sample.

Figure 6A:
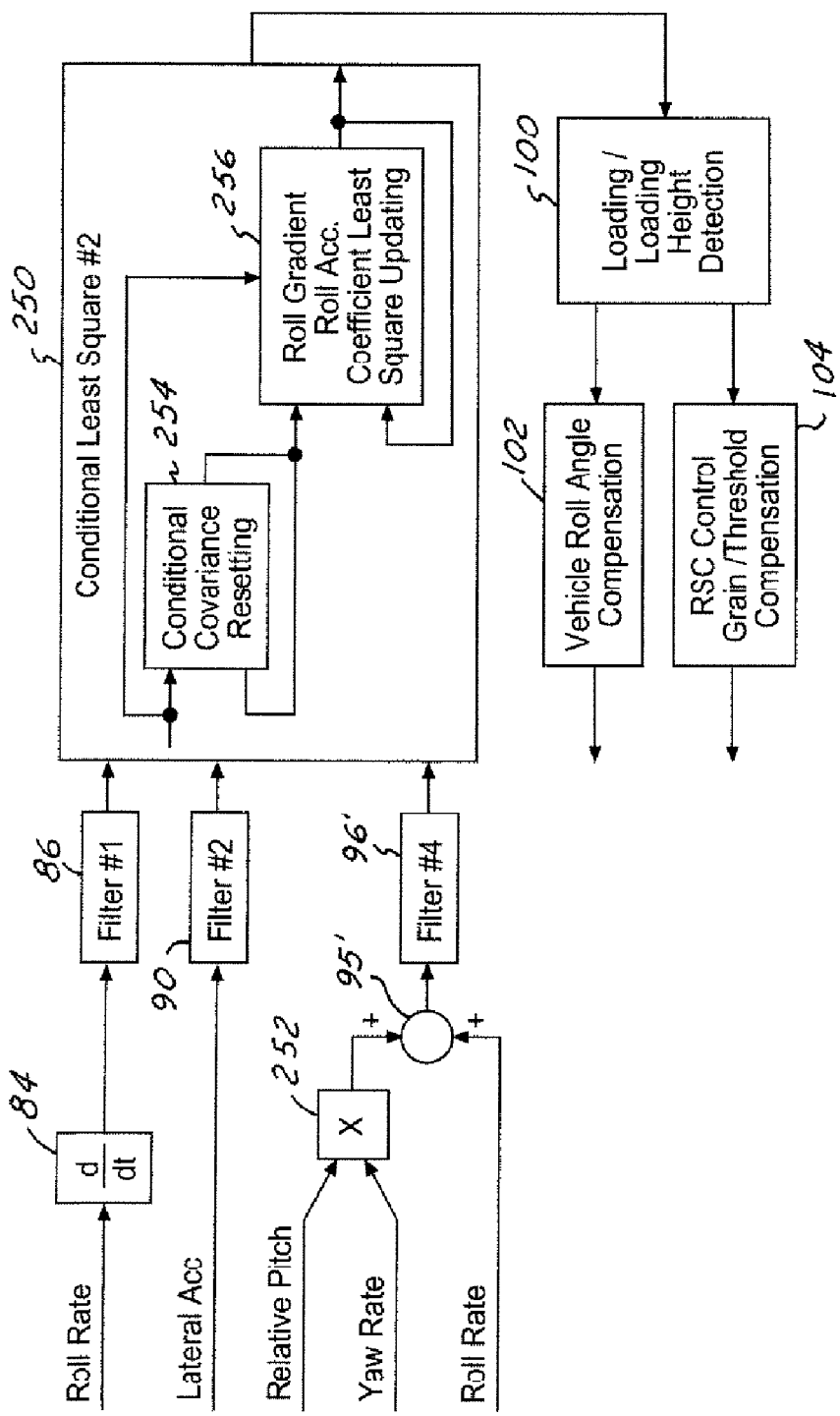
FIG. 6A is a block diagrammatic view of a controller according to a second embodiment of a least square method of the present invention.

Referring to FIG. 6A, the second conditional least square method is illustrated by box 250. Blocks 84, 86, 90 are the same as in FIG. 6. This embodiment, however, uses a relative pitch signal instead of the longitudinal acceleration signal. The relative pitch signal and yaw rate signal are multiplied in block 252. The output of block 252 is added to the roll rate in addition to block 95' and filtered in block 96'. The filtered signals from blocks 86, 90, 96' are provided to a conditional covariance block 254. The block 254 output is provided to roll gradient, roll acceleration coefficient least square updating block 256, which provides an output to block 100.

Since $\alpha$ and $\beta$ are related to the inertia parameters of the vehicle body roll motion, only if the vehicle roll mode is fully excited $\alpha$ and $\beta$ can be identified correctly through least-square methods. Hence, under the steady-state driving condition, the least-square identification is not conducted. Therefore, a further condition reflecting vehicle roll dynamic condition is needed. Considering the driver's steering input could induce roll dynamics, one of such conditions can be characterized using the steering wheel angle velocity, i.e., only if $$|\dot{\delta}_w| \geq \delta_{wvmin}$$

the CLS method will be conducted, $\delta_w$ is the measured steering wheel angle, $\delta_{wvmin}$ is a threshold (for example, 20 degree per second).

In step 114, the conditional sum of the products or cross products of the above filtered variables are determined over a significant large number N of the conditional samples. This is performed using the following iterative algorithm if the first CLS method is used $$\text{if } (|\dot{\delta}_w| \geq \delta_{wvmin} \text{ \& level ground} \quad (18)$$
$$\text{\& no wheel lifting}$$
$$\text{\& } s \leq N)$$
$$\{$$
$$a_{11_{s+1}} = a_{11_s} + X_k^2$$
$$a_{21_{s+1}} = a_{21_s} - X_k Y_k$$
$$a_{22_{s+1}} = a_{22_s} + Y_k^2$$
$$b_{1_{s+1}} = b_{1_s} + X_k U_k$$
$$b_{2_{s+1}} = b_{2_s} - Y_k U_k$$
$$s = s + 1$$
$$\}$$

Notice that the time instant denoted by k is different from the CLS updating instant denoted by s. Only if the conditions are satisfied all the time, then s=k. N in (18) is the total number of conditional samples used for CLS, which could have value ranged from 1000 to 80,000.

Step 114 is performed for the conditional sample when the road is a level ground. The level ground can be identified if there is an indication that the vehicle is not on a significantly banked road. Therefore, checking road bank can be used for this purpose, for example, using the method disclosed in U.S. Pat. No. 6,718,248. The level ground can also be checked through a flatness index (as the one calculated in U.S. Pat. No. 6,718,248), or a road profile detection (see U.S. Pat. No. 6,718,248), or a rough comparison between the global roll angle and the nominal chassis roll angle.

In step 116, the nominal values for $\alpha_0$ and $\beta_0$ of the roll gradient and roll acceleration coefficient are calculated. They can also be obtained by using test data from the vehicle with nominal loading condition and nominal configuration.

In step 118, the roll gradient $\alpha$ and the roll acceleration coefficient $\beta$ are computed as in the following $$\text{if } s = N \quad (19)$$
$$\{$$
$$D = \min\left(\max\left(a_{11_N} - \frac{a_{21_N}^2}{\max(a_{22_N}, a_{min})}, -a_{min}\right), a_{min}\right);$$
$$\alpha = \min\left(\max\left((b_{1_N} - \frac{a_{21_N} b_{2_N}}{\max(a_{22_N}, a_{min})})D^{-1}, \underline{\alpha}\right), \overline{\alpha}\right);$$

-continued $$\beta = \min\left(\max\left(\begin{pmatrix} \frac{a_{11_N} b_{2_N}}{\max(a_{22_N}, a_{min})} - \\ \frac{a_{21_N} b_{1_N}}{\max(a_{22_N}, a_{min})} \end{pmatrix} D^{-1}, \underline{\beta}\right), \overline{\beta}\right);$$

$$s = 0;$$
$$a_{11_s} = 0; a_{21_s} = 0; a_{22_s} = 0;$$
$$b_{1_s} = 0; b_{2_s} = 0;$$
$$\}$$

where $a_{min}$ is a small number (for example, 0.0001), which is used to remove division by zero in the implemented computation; $\underline{\alpha}$ and $\overline{\alpha}$ are the respective lower and upper bounds of the roll gradient, which can be calculated as $$\underline{\alpha} = \alpha_0 - \Delta\alpha$$
$$\overline{\alpha} = \alpha_0 + \Delta\alpha \quad (20)$$

and $\alpha_0$ is the nominal value of the roll gradient (obtained through vehicle testing for the vehicle with nominal loading), $\Delta\alpha$ is the allowed variation of the roll gradient; $\underline{\beta}$ and $\overline{\beta}$ are the respective lower and upper bounds of the roll acceleration coefficient, which can be obtained as $$\underline{\beta} = \beta_0 - \Delta\beta$$
$$\overline{\beta} = \beta_0 + \Delta\beta \quad (21)$$

and $\beta_0$ is the nominal value of the roll acceleration coefficient (for vehicle with nominal loading), $\Delta\beta$ is the allowed variation of the roll acceleration coefficient. If the second CLS method is used, the roll gradient $\alpha$ and the roll acceleration coefficient $\beta$ can be calculated in block 256 through the following iterative algorithm. First, a 2 by 2 matrix variable $V_{s+1}$ at the (s+1)th conditional time instant is calculated from its past value $V_s$ and the calculated filtered values of $X_k$ and $Y_k$ as in the following $$\text{if } (|\dot{\delta}_w| \geq \delta_{wvmin} \text{ \& level ground} \quad (22)$$
$$\text{\& no wheel lifting}$$
$$\text{\& } s \leq N)$$
$$\{$$
$$\text{if } (s = 0)$$
$$\left\{ V_0 = \begin{bmatrix} v_0 & 0 \\ 0 & v_0 \end{bmatrix}; \right\}$$
$$V_{s+1} = V_s - g \frac{V_s \begin{bmatrix} X_k^2 & -X_k Y_k \\ -X_k Y_k & Y_k^2 \end{bmatrix} V_s}{1 + \gamma [X_k \ -Y_k] V_s [X_k \ -Y_k]^T};$$
$$\}$$

where g, $\gamma$ and $v_0$ are three positive numbers, and the time instant k denotes the regular time instant and the time instant s is the conditional time instant. Equation (22) is also called the covariance resetting in the normalized least square algorithm.

The roll gradient and the roll acceleration coefficient are calculated using the 2 by 2 matrix $V_s$, and the calculated filtered values $X_k, Y_k$ and $U_k$, as in the following if $(|\delta_w| \geq \delta_{wvmin}$ & level ground (23)

& no wheel lifting

& $s \leq N)$

{

$$\begin{bmatrix} \alpha_{s+1} \\ \beta_{s+1} \end{bmatrix} = \begin{bmatrix} \alpha_s \\ \beta_s \end{bmatrix} - g \frac{S_s[X_k \ -Y_k]^T U_k}{1 + \gamma[X_k \ -Y_k]S_s[X_k \ -Y_k]^T};$$

$s = s + 1;$

}

The calculated values are also limited to within their feasible sets as in the following $\alpha_{s+1} = \text{sat}(\alpha_{s+1}, \alpha_0 - \Delta\alpha, \alpha_0 + \Delta\alpha)$ $\beta_{s+1} = \text{sat}(\alpha_{s+1}, \beta_0 - \Delta\beta, \beta_0 + \Delta\beta)$ (24)

Notice that during the time instant where the conditions for (22) and (23) do not hold, the computations are frozen to the last values. That is if the following conditions are not true at a time instant k $(|\delta_w| \geq \delta_{wvmin}$ & level ground (25)

& no wheel lifting

& $s \leq N)$ then computation in (2), (23) and (24) are not conducted, and the involved variables will keep the values for the last conditional sample s $V_k = V_s;$ $\alpha_k = \alpha_s;$ $\beta_k = \beta_s.$ (26)

From the calculated roll gradient and the roll acceleration coefficient, the vehicle loading and its distance to the center of gravity of the vehicle body in the vertical direction can be determined in the following in step 122.

From FIG. 4, $M_s$ is the vehicle body mass and the height of the center of gravity $C_0$ of the car body is denoted as h which is measured in the vertical direction with respect to the vehicle floor. A loading of mass $\Delta M$ is added to the vehicle. The distance between the center of gravity of this mass relative to the vehicle floor is denoted as H. The center of gravity C of the vehicle body is likely to change due to the added mass $\Delta M$. The distance between $C_0$ and C is denoted as $\Delta H$. Then $\Delta H$ must satisfy the following relationship $$\Delta H = \frac{\Delta M}{M_s + \Delta M}(H - h)$$ (27)

that is, the unknown $\Delta H$ can be readily obtained from the added mass $\Delta M$, the height of the added mass H, the center of gravity height h of the vehicle body and the vehicle mass $M_s$ prior to the addition of the mass $\Delta M$.

The total roll inertial momentum of the vehicle body with respect to the final center of gravity C can be expressed as $I_{xc} = I_{xc}^M + I_{xc}^{\Delta M}$ (28)

where $I_{xc}^M = I_{xc0} + M_s \Delta H^2$ $I_{xc}^{\Delta M} = \Delta M(H - h - \Delta H)^2$ (29)

By inserting equation (27) into equation (29), equation (28) can be expressed as the following $$I_{xc} = I_{xc0} + \frac{M_s \Delta M (H - h)^2}{M_s + \Delta M}$$ (30)

The nominal roll gradient and the roll acceleration coefficient is $\alpha_0$ and $\beta_0$. Then $$\alpha_0 = \frac{M_s h}{K_{roll}}$$ (31)

$$\beta_0 = \frac{I_x}{K_{roll}}$$

where $K_{roll}$ denotes the roll stiffness due to suspension and anti-roll bar. Using those nominal values and the calculated values $\alpha$ and $\beta$, the loading mass and the loading distance satisfy the following $$\Delta M H = K_{roll}(\alpha - \alpha_0) = A$$ (32)

$$\frac{\Delta M M_s (H - h)^2}{M_s + \Delta M} = K_{roll}(\beta - \beta_0) = B$$

From the relationship in equation (32), the following estimations may be determined $$\begin{cases} H = h + \frac{B}{2A} + \sqrt{\frac{1}{4}\left(\frac{B}{A}\right)^2 + h\left(\frac{B}{A}\right) + \left(\frac{B}{M_s}\right)^2} \\ \Delta M = \frac{\alpha}{h + \frac{B}{2\alpha} + \sqrt{\frac{1}{4}\left(\frac{B}{A}\right)^2 + h\left(\frac{B}{A}\right) + \left(\frac{B}{M_s}\right)^2}} \end{cases}$$ (33)

In step 124, the height H of the added mass ($\Delta M$) from the vehicle floor based on the first equation of (33) is determined.

In step 126, the added mass $\Delta M$ is determined based on the second equation of (33) by using the calculated height H of the added mass.

In step 128, a safety system such as a roll stability control system is controlled in response to the added mass and the height of the added mass. The safety system may also be controlled directly from the roll gradient and roll rate parameter, both of which may be adaptive. The safety system may also include the roll acceleration coefficient, which may also be adaptive as a factor in addition to the adaptive roll gradient and adaptive roll rate parameter. A vehicle roll angle compensation term may be determined such as that shown above. The vehicle roll angle compensation term may sensitize the roll angle computation for earlier deployments. The amount of roll compensation will depend on the particular vehicle and the characteristics of such things as the suspension and configuration of the vehicle. A roll stability control gain/threshold compensation term may also be generated. The threshold may be changed to allow earlier deployment if an added mass at a predetermined height is determined in steps 124 and 126. The amount of compensation will likely be determined experimentally based on the vehicle configuration.

Thus, as can be seen, the roll signal for control may be adjusted according to the vehicle loading and its height. On the other hand if the vehicle has a significant amount of loading, i.e., the calculated loading exceeds a threshold $L_{max}$ $$\Delta M \geq L_{max} \quad (34)$$

and at the same time the height of the mass exceeds another threshold $H_{max}$ $$H \geq H_{max} \quad (35)$$

then in addition to the adjusted computation of roll signal for control (through the adjustment of the chassis roll angle using the new roll gradient and roll acceleration coefficient), all the gains for the feedback control used for commanding the actuators are set to a set of values $G_{RLMAX}$ tuned for larger roof loadings, or adaptively adjusted in high values based on the amount of $\Delta M$. In this way, when the vehicle has double wheel lift, the proper amount of actuation will be requested so the vehicle achieves robust roll stability control function during rollover event involving vehicles with large roof loadings.

If the vehicle has a significant loading, i.e., $\Delta M \geq L_{max}$, but the loading is a floor loading, that is, the height of the loading is smaller than a lower threshold $H_{min}$ $$H \leq H_{min} \quad (36)$$

all the gains for the feedback control used for commanding the actuators are set to a set of values $G_{FLMAX}$ tuned for larger floor loadings.

If the vehicle has a significant loading, i.e., $\Delta M \geq L_{max}$, but the loading height is between the roof and floor, i.e., H is between a lower threshold $H_{min}$ (possibly zero) and the higher threshold $H_{max}$ $$H_{min} \leq H \leq H_{max} \quad (37)$$

all the gains for the feedback control used for commanding the actuators are set to the following values adjusted based on the detected loading height as in the following $$G_H = G_{FLMAX} + \frac{H - H_{min}}{H_{max} - H_{min}}(G_{RLMAX} - G_{FLMAX}) \quad (38)$$

If the vehicle has a roof loading which is below the maximum allowed roof loading $L_{max}$ but above the lower bound of a valid roof loading $L_{min}$, i.e., $$L_{min} \leq \Delta M \leq L_{max} \quad (39)$$

Assume all the nominal gains for feedback (for the vehicle with nominal loading) are denoted as $G_{nom}$, then the control gains will be adjusted based on the detected roof loading as in the following $$G_{\Delta M} = G_{nom} + \frac{\Delta M - L_{min}}{L_{max} - L_{min}}(G_{RLMAX} - G_{nom}) \quad (40)$$

The roll gradient itself can also be directly used to adjust control gains. If the vehicle has a significant increase of roll gradient, i.e., $\alpha \geq \alpha_{min}$, then all the gains for the feedback control used for commanding the actuators are set to the following values adjusted based on the detected roll gradient as in the following $$G_\alpha = G_{\alpha MIN} + \frac{\alpha - \alpha_{min}}{\alpha_{max} - \alpha_{min}}(G_{\alpha MAX} - G_{\alpha MAX}) \quad (41)$$

where $\alpha_{min}$ is the roll gradient corresponding to a vehicle without roof loading and $\alpha_{max}$ is the roll gradient corresponding to the vehicle with maximum roof loading allowed.

Notice that the control gain adjustments other than the above listed linear interpolation methods are possible. Also, notice that the dead-bands and thresholds used in roll stability feedback control can also be similarly adjusted based on the loading height H and/or the loading $\Delta M$, or the roll gradient, or the roll moment of inertia calculated as in (30).

Combining those control gain, dead-band and threshold adjustments with the quantitative roll angle (for example, the chassis roll) adjustment, a robust roll stability control function can be achieved.

Notice that based on the afore-mentioned computation of the added mass and its vertical from the vehicle floor, the roll moment of inertia of the vehicle body can be readily calculated as in (30). Alternatively, the roll moment of inertia $I_{xx}$ can be determined directly by using the equation $$M_s a_y h_{cg} - K_{roll}\theta_{xr} - D_{roll}\dot{\theta}_{xr} = I_{xx}\dot{\omega}_x \quad (42)$$

where $M_s$ is vehicle mass, $a_y$ is the measured lateral acceleration, $h_{cg}$ is the center of mass height above the roll center, $K_{roll}$ is the roll stiffness of the suspension, $\theta_{xr}$ is the relative roll of the body with respect to the wheels (or ground), $D_{roll}$ is the roll damping of the suspension, $\dot{\theta}_{xr}$ is the relative roll velocity and $\dot{\omega}_x$ the roll acceleration (obtained by differentiating the roll rate obtained from the roll rate sensor), and $I_{xx}$ the roll inertia, in kg-m$^2$.

When $a_y$ and $\theta_{xr}$ are zero but $\dot{\theta}_{xr}$ and $\dot{\omega}_x$ are non-zero, then $$I_{xx} = -D_{roll}\dot{\theta}_{xr}/\dot{\omega} \quad (43)$$

Or, when $\theta_{xr}$ and $\dot{\theta}_{xr}$ are zero and the mass, $M_s$ is determined by another means, $$I_{xx} = M_s a_y h_{cg}/\dot{\omega}_x \quad (44)$$

Alternatively, the roll response of the vehicle, obtained from the roll rate sensor, can be analyzed in the frequency domain to determine roll gradient and roll acceleration coefficient:

- $\omega_d$=the damped natural frequency of the roll motion of the vehicle (Hz)
- $\omega_n$=the undamped natural frequency of the roll motion of the vehicle (Hz)
- $\zeta$=the damping ratio of the roll motion of the vehicle (unitless)

Taking the Laplace transform of $$\theta_{xr} + \frac{D_{roll}}{K_{roll}}\dot{\theta}_{xr} = \frac{M_s h_{cg}}{K_{roll}}a_y - \frac{I_{xx}}{K_{roll}}\dot{\omega}_x \quad (45)$$

and rearranging yields the following by considering $\dot{\omega}_x \approx \ddot{\theta}_{xr}$ when the vehicle does not have large pitch motion or the vehicle does not have large yaw rate:

$$\frac{\Theta_{xr}(s)}{A_y(s)} = \frac{1}{\frac{I_{xx}}{M_s h_{cg}}s^2 + \frac{D_{roll}}{m_s h_{cgs}}s + \frac{K_{roll}}{m_s h_{cgs}}} \quad (46)$$

$$= \left(\frac{M_s h_{cg}}{K_{roll}}\right)\frac{1}{\frac{I_{xx}}{K_{roll}}s^2 + \frac{D_{roll}}{K_{roll}}s + 1}$$

where $\Theta_{xr}(s)$ and $A_y(s)$ are the Laplace transform of the $\theta_{xr}$ and $a_y$ respectively.

Using a digital fast Fourier transform to construct a frequency response function and determine the magnitude of $$\frac{\Theta_{xr}(s)}{A_y(s)}$$

vs. frequency, the roll gradient is equal to the DC gain (Equation 7 evaluated at s=0).

The peak of the magnitude of the frequency response function will occur at the damped natural frequency, $$\omega_d = \omega_n\sqrt{1-\zeta^2} \quad (47)$$

where $\omega_n$ is the undamped natural frequency and $\zeta$ is the damping ratio. (Alternatively, the damped natural frequency can be determined from "impulse-like" inputs into the suspension (hitting a bump in the road or a pot-hole), and determining the frequency of the roll oscillations.)

From (45)

$$\omega_n = \sqrt{\frac{K_{roll}}{I_{xx}}} \Rightarrow \frac{I_{xx}}{K_{Roll}} = \frac{1}{\omega_n^2} = -\beta \quad (48)$$

$$\zeta = \frac{\omega_n D_{roll}}{2K_{roll}} \quad (49)$$

Substituting Equation (49) into Equation (47) gives $$\omega_d = \omega_n\sqrt{1 - \frac{\omega_n D_{roll}^2}{2K_{roll}}} \quad (50)$$

Equation (50) can be solved for $\omega_n$, which can in turn be used to evaluate Equation (48) and solve for the roll acceleration coefficient $\beta$.

Another way to determine roll inertia is to use an indirect empirical approach. First, a mass is determined, then the inertia may be correlated to mass. That is, a first estimate mass is determined via a method such as that described in Invention Disclosure (203-0482) filed as U.S. patent application Ser. No. 10/849,590, the disclosure of which is incorporated by reference herein, or another method. Then the inertia may be obtained per various methods explained below:

a. Assume inertia changes as mass changes from its base values, $M_{s\_base}$ to the current value, $M_{s\_current}$ as:

$$I_{xx\_total} = I_{xx\_base} + h_2(M_{s\_current} - M_{s\_base}) \quad (51)$$

where $h_2$ is assumed to be a constant. Based on testing for a vehicle loaded several ways, an average may then be used.

b. Correlate roll inertia, $I_{xx}$, to vehicle mass; e.g., via testing using a vehicle inertial measurement facility to get roll inertia, the mass for various loading conditions and roof loads may be correlated. This is based on the premise that you can only load an SUV so many ways (e.g., mass above curb loading must be placed in vehicle seats and/or on the roof rack). Again, the vehicle mass may be determined via a method described in U.S. patent application Ser. No. 10/849,590 or another method, then use the roll inertia, $I_{xx}$, corresponding to that mass obtained from testing.

The currently estimated mass or roll inertia estimate can be used several ways in the RSC algorithm, including:

Improved state estimation: Since mass and inertia values are used in the roll, pitch, and yaw angle state estimates, values accurately reflecting the actual vehicle will improve the accuracy, improve RSC control, and reduce the occurrence of false interventions.

Modified thresholds for activation: For example, a fully loaded vehicle can be less stable in roll. Hence, tighter thresholds on roll angle and roll rate, for example, can be used. This will increase the level of RSC control for the same level of roll angle and velocity for the loaded vehicle.

c. Increased gains for the RSC PID and/or Transition controllers.

d. Less stringent entry conditions for PID or Transition control intervention.

e. Any combination of the above.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling a safety system for a vehicle comprising:
generating a roll rate signal indicative of a roll rate of the vehicle over time;
determining a height of each change in mass onboard said vehicle over time as a function of said roll rate signal; and
adaptively controlling said safety system in response to the height of each change in mass determined over said time.

2. A method as recited in claim 1 wherein said height of each change in mass comprises a height of the center of gravity of said vehicle including the change in mass.

3. A method as recited in claim 1 wherein adaptively controlling said safety system comprises controlling a roll stability control system.

4. A method as recited in claim 1 wherein adaptively controlling said safety system is at least partially accomplished by a roll angle determination that is iteratively adjusted according to said height of each change in mass.

5. A method as recited in claim 1 wherein adaptively controlling said safety system is at least partially accomplished by control gains that are adjusted according to said height of each change in mass.

* * * * *